No. 721,692. PATENTED MAR. 3, 1903.
M. L. J. GIRDANY.
FASTENING FOR SETTINGS FOR PRECIOUS STONES.
APPLICATION FILED APR. 19, 1902.
NO MODEL.

Witnesses:

Inventor:
Morris L. J. Girdany
by James E. Byrne
attorney

UNITED STATES PATENT OFFICE.

MORRIS LAZARUS JOSEPH GIRDANY, OF BOSTON, MASSACHUSETTS.

FASTENING FOR SETTINGS FOR PRECIOUS STONES.

SPECIFICATION forming part of Letters Patent No. 721,692, dated March 3, 1903.

Application filed April 19, 1902. Serial No. 103,835. (No model.)

*To all whom it may concern:*

Be it known that I, MORRIS LAZARUS JOSEPH GIRDANY, a citizen of the United States, residing at No. 8 Rosemont street, Boston, in the county of Suffolk and State of Massachusetts, have invented a new and useful Fastening for Settings for Precious Stones, of which the following is a specification.

My invention relates to improvements in fastenings for settings for precious stones in which the fastening is made by means of a screw and traveling nut (or clamp) and locking device or a smooth spindle and sliding clamp and locking device; and the objects of my invention are to provide means to lock the screw, sliding, or other fastenings, and thereby prevent loss of the jewelry by the working loose and unscrewing of the nut off of the screw by the motions of the body or continual accidental striking of the gems or settings against objects. I attain these objects by the mechanism illustrated in the accompanying drawings, in which—

Figure 1:
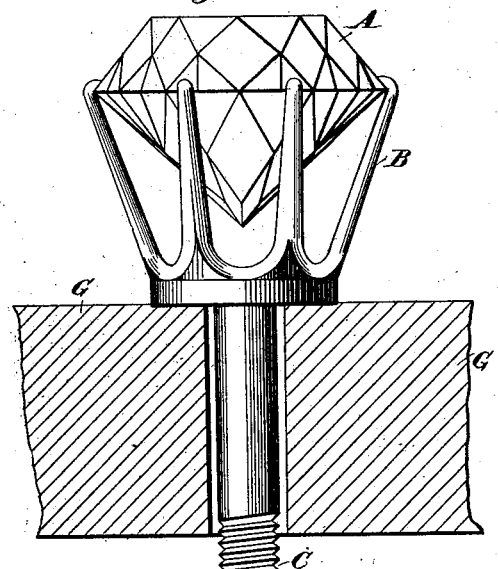
Figure 3:
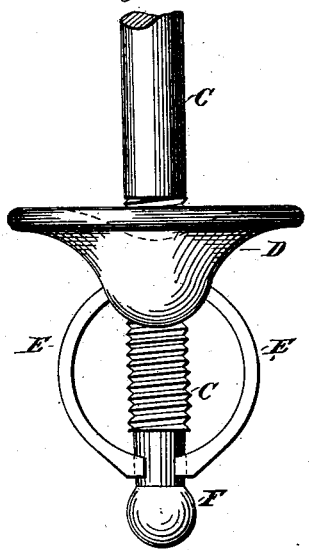
Figure 4:
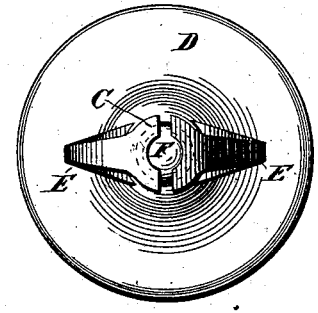
Figure 2:
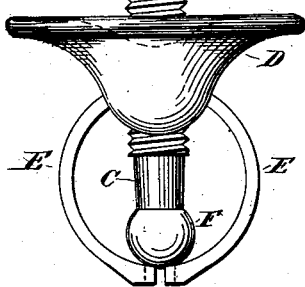

Figure 1 is an elevation of a setting and fastening. Fig. 2 is a top view or plan of the fastening. Figs. 3 and 4 are elevations of the fastening.

Similar letters refer to similar parts throughout the several views.

A represents a precious stone in a setting B, which is attached to a screw C, having at its end or other part a spherical, conical, or other cam-shaped knob. On the screw C is a nut D, which travels along it and clamps a lady's ear, a cuff, or a shirt-bosom against the base of the setting B. The nut or clamp D carries springs E.

The operation of the fastening is as follows: The nut or clamp D may be screwed on or off the screw C by hand, the springs E snapping over the knob or cam F, as shown in Figs. 3 and 4. When the clamp D clamps a cuff, an ear, or a shirt-bosom, the springs E and the knob F prevent the nut D from unscrewing and working off of the screw C, thereby locking it and preventing the piece of jewelry from being lost. If the jarring or striking should be sufficient to work the springs E over the knob F, the springs E snap appreciably loud to warn the wearer of the fact, especially in the case of ladies' ear-studs.

I am aware that prior to my invention screw-and-nut clamp-fasteners have been made and used in connection with settings for precious stones. I therefore do not claim such a combination broadly; but What I do claim as my invention, and desire to secure by Letters Patent, is—

The combination of a setting for precious stones, a screw fitted with a spherical, conical, or other shaped knob or cam, a traveling nut or clamp, and springs carried by the traveling nut or clamp for engaging with the knob or cam, all substantially as set forth.

In testimony whereof I have affixed my signature in presence of two witnesses.

MORRIS LAZARUS JOSEPH GIRDANY.

Witnesses:
CHARLES A. BURDING,
JACOB RATSKOFF.